April 28, 1959 W. A. BISHMAN 2,883,858
TUBELESS TIRE TESTER
Filed April 25, 1956 5 Sheets-Sheet 1

INVENTOR.
WALTER A. BISHMAN
BY
ATTORNEYS

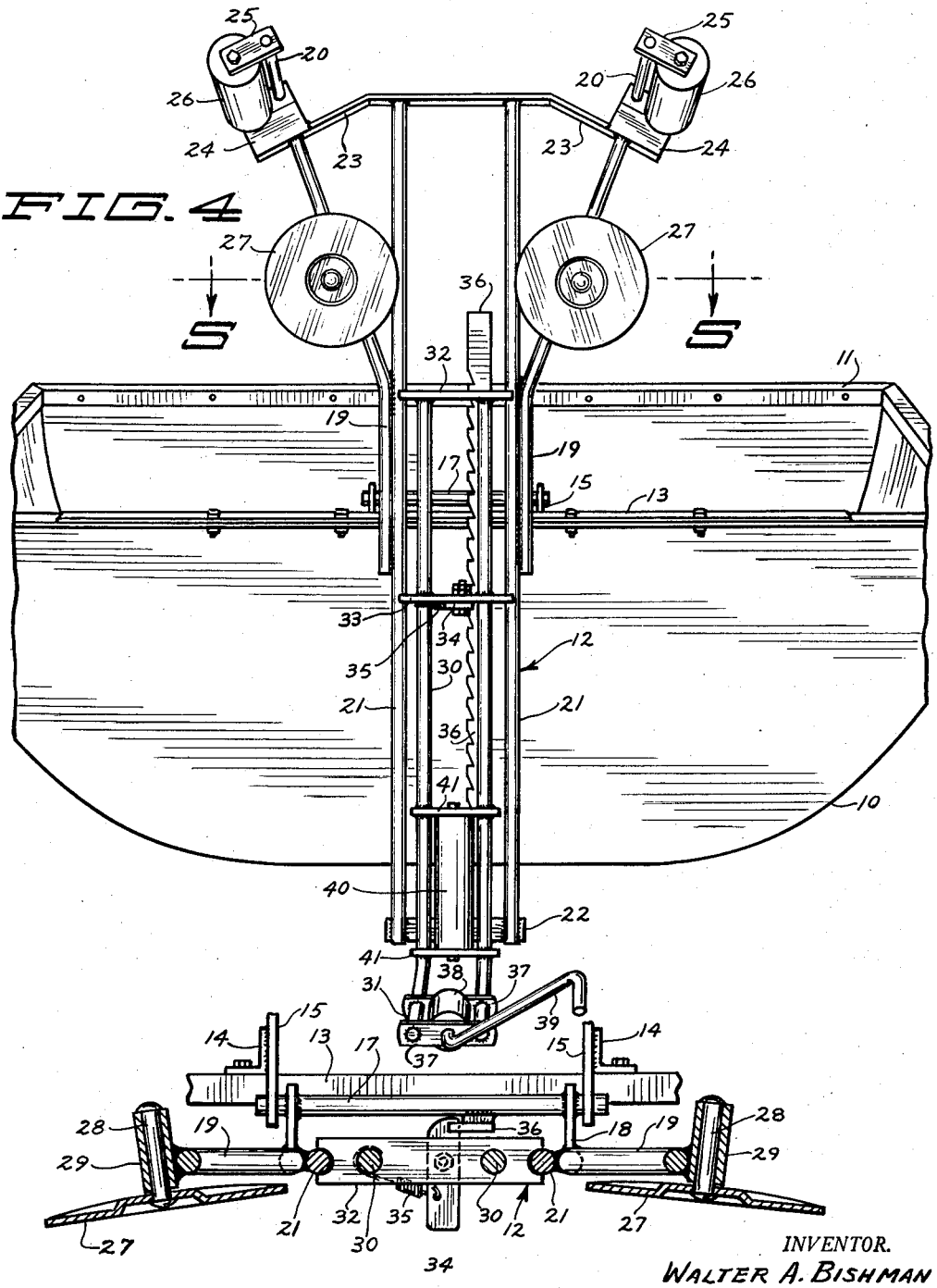

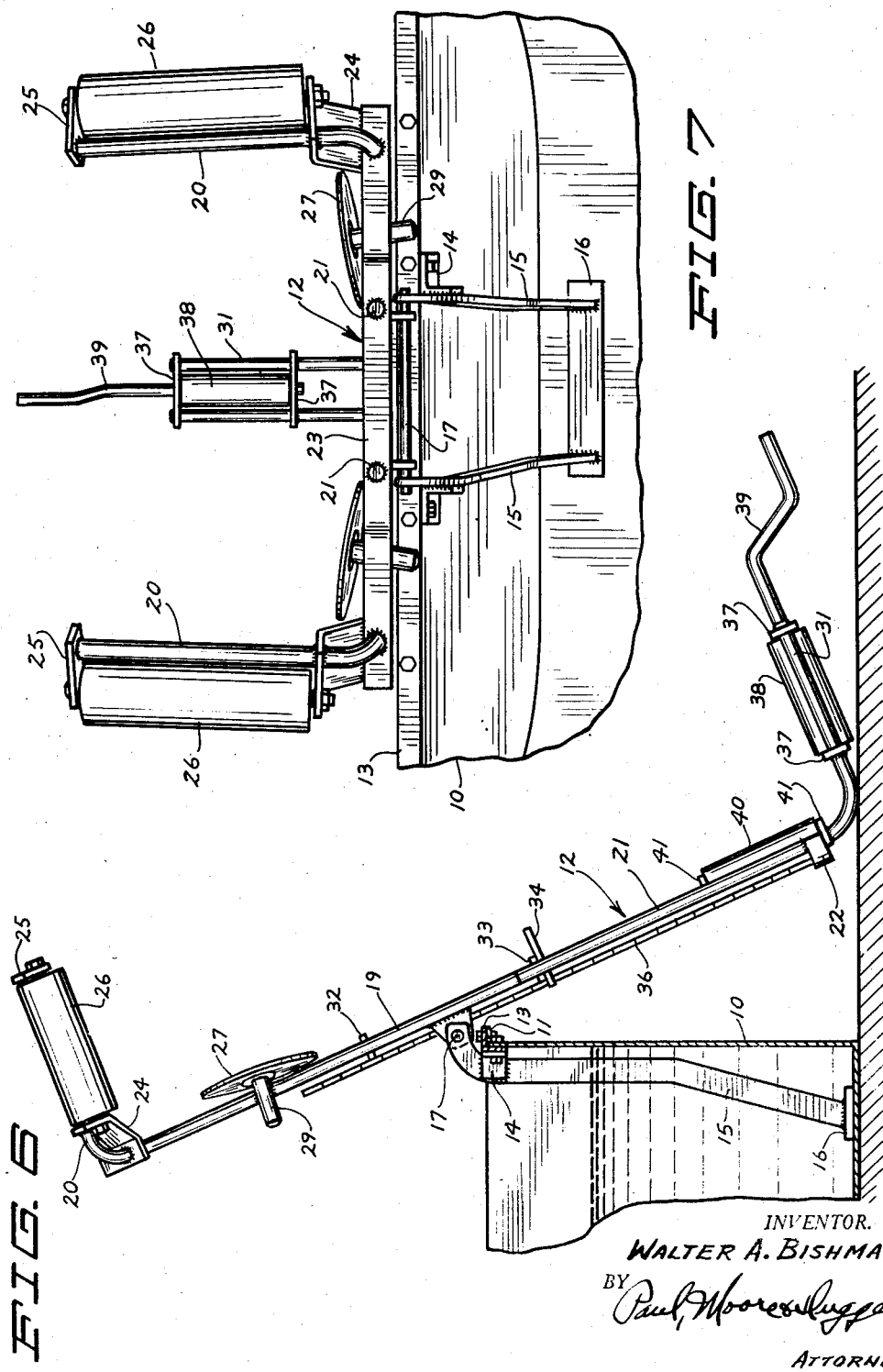

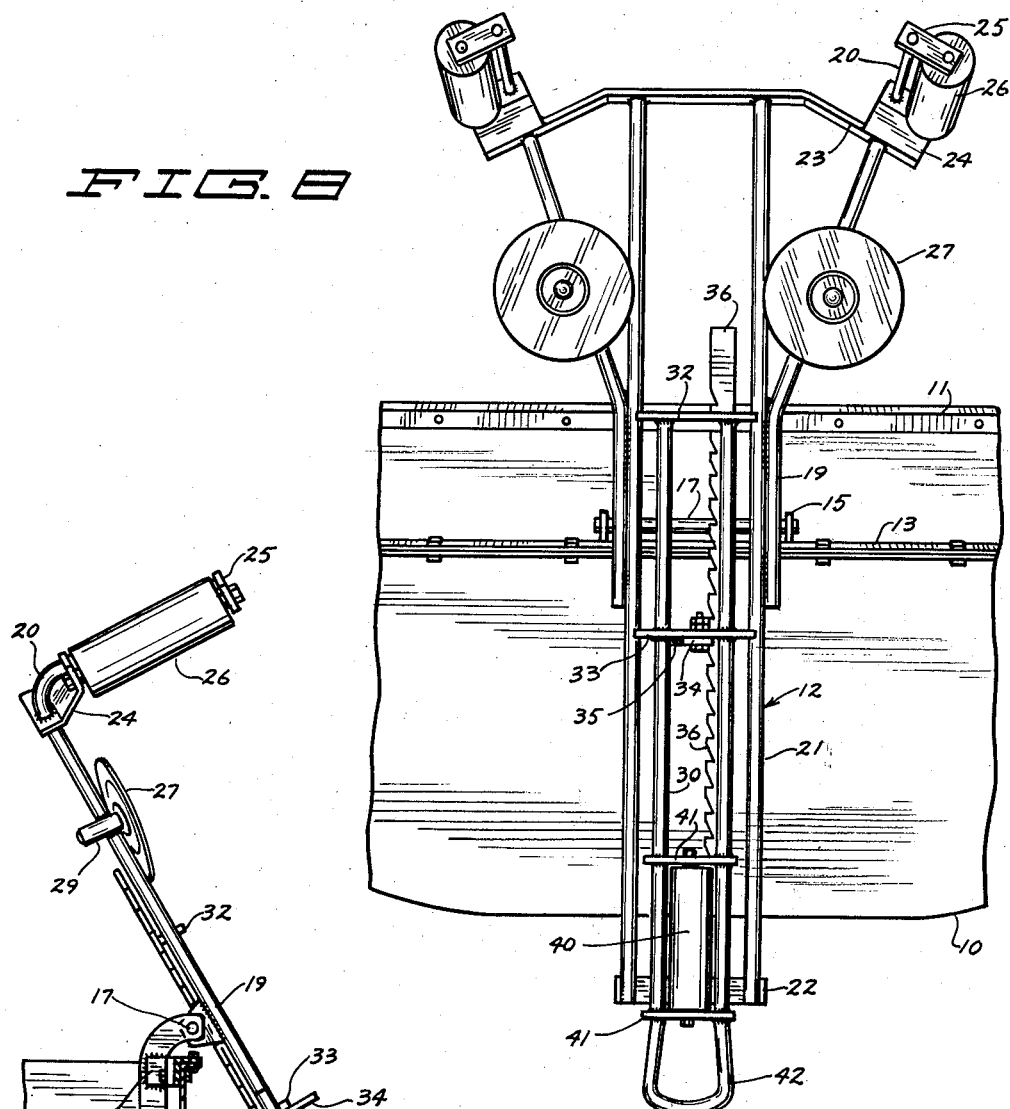

April 28, 1959
W. A. BISHMAN
2,883,858
TUBELESS TIRE TESTER
Filed April 25, 1956
5 Sheets-Sheet 5
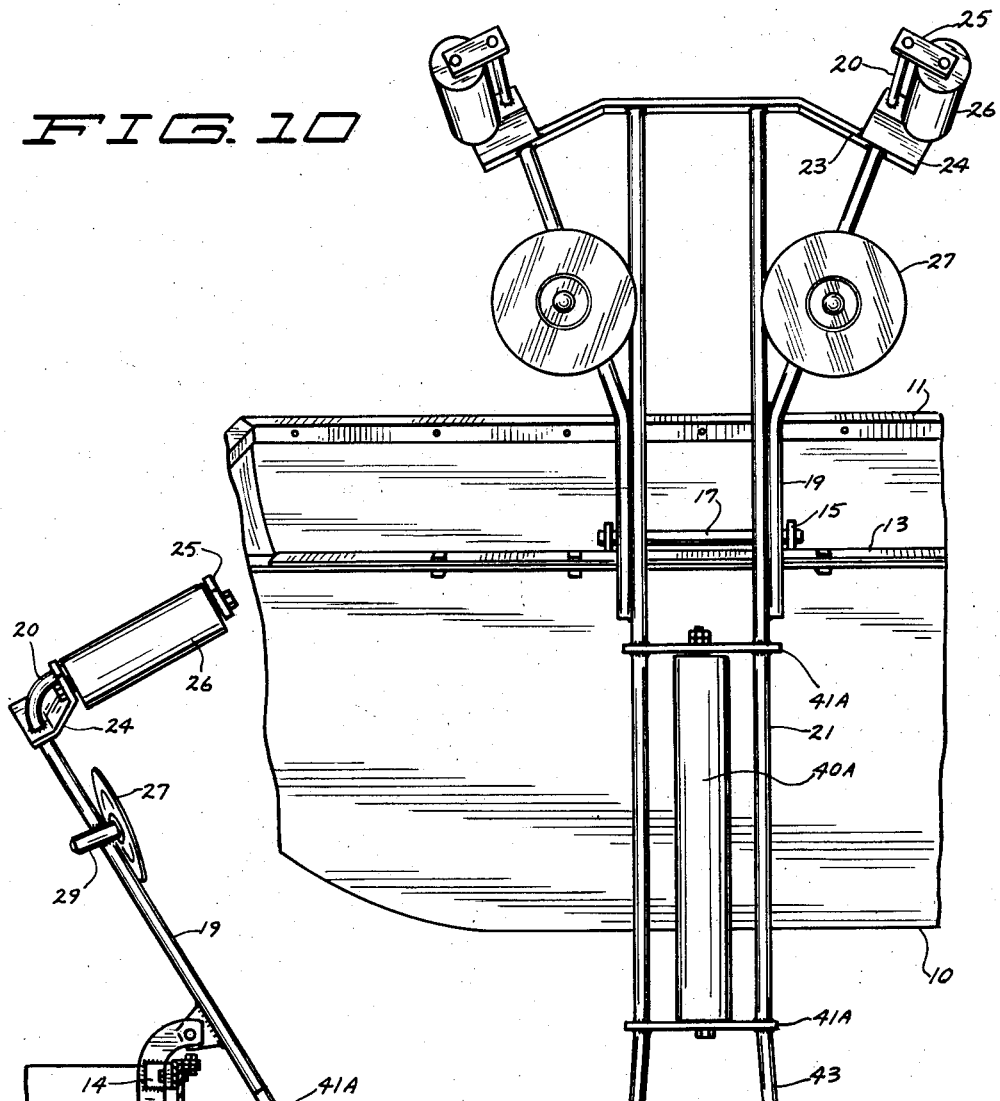
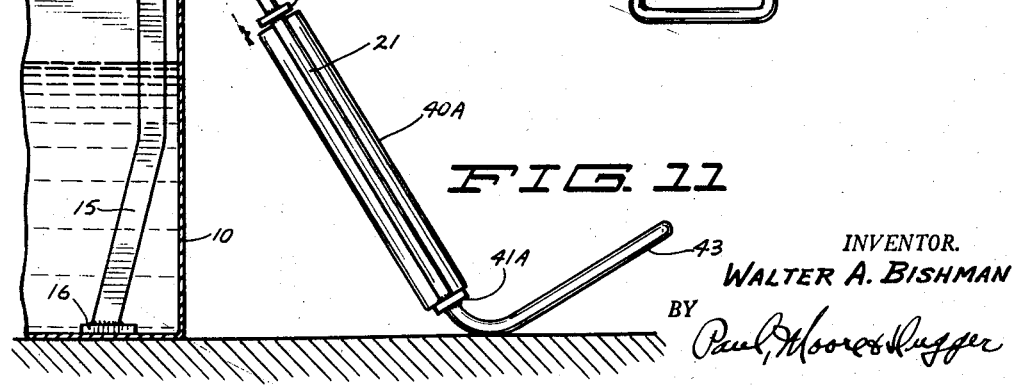
INVENTOR.
WALTER A. BISHMAN
BY
ATTORNEYS

United States Patent Office 2,883,858
Patented Apr. 28, 1959

2,883,858
TUBELESS TIRE TESTER

Walter A. Bishman, Minneapolis, Minn., assignor to Bishman Manufacturing Company, Osseo, Minn., a corporation of Minnesota Application April 25, 1956, Serial No. 580,549

15 Claims. (Cl. 73—45.6)

This invention relates to a device for use in the detection of leaks in tubeless pneumatic tires.

The time-tested method for detecting and locating leaks in air-filled inner tubes has been either to submerge the inflated tube completely in water or to slowly rotate the tube partly submerged in water. The presence of any leaks is immediately indicated by bubbles arising from the point of leakage. With the advent and widespread use of tubeless tires the same method of leak detection is retained. It is somewhat more difficult to cope with the increased weight of the tubeless tire and rim, particularly in the case of truck tires and similar large tires.

It is the principal object of this invention to provide an improved tubeless tire tester having a water tank, tire receiving means pivotally mounted with respect to the tank to tilt a tire into the tank and means associated with the tire receiving means to rotate the tire within the tank.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 4 is a front elevation of the tire tester, without a tire, showing in greater detail the adjustable tire receiving means;

Figure 5 is a generally horizontal section on the line 5—5 of Figure 4 and in the direction of the arrows;

Figure 6 is a fragmentary end elevation of the tire tester;

Figure 7 is a fragmentary plan view of the tester;

Figure 1:
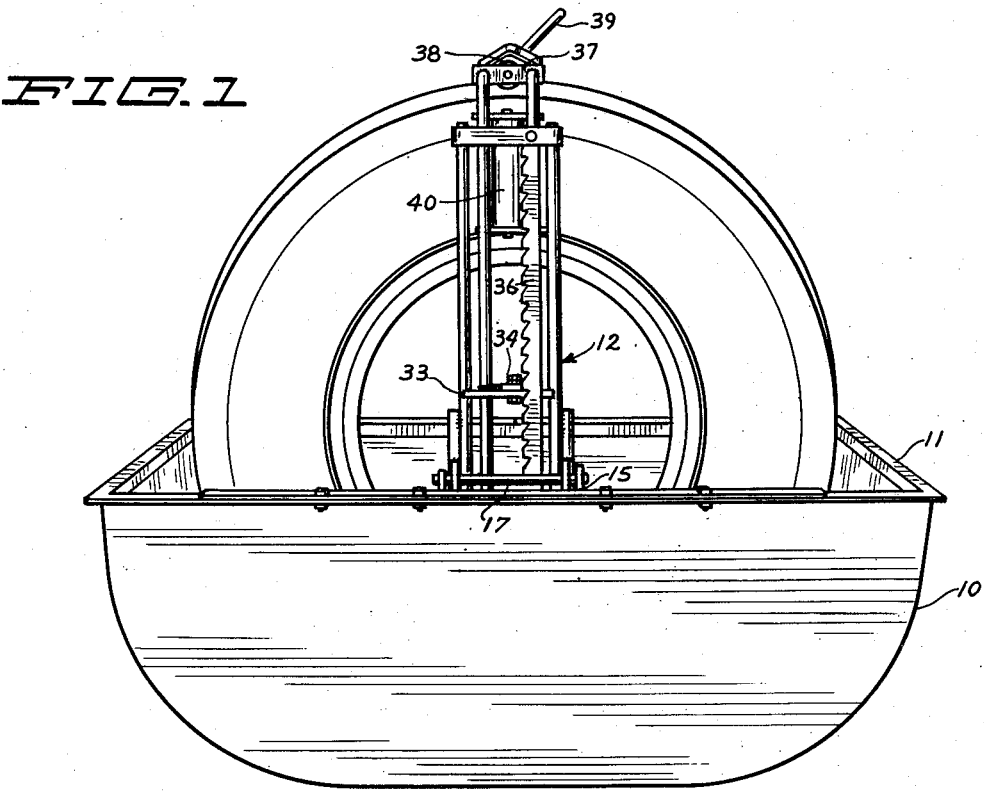
Figure 1 is a front elevation in perspective showing a preferred form of the tire tester in use with a tire partially submerged in the water tank.

Figures 8 and 9 are front and end elevations respectively, similar to Figures 4 and 6, but showing a modified and simplified form of construction; and Figures 10 and 11 are front and end elevations respectively, similar to Figures 8 and 9, but showing a further modified and more simplified form of construction.

Referring now to the drawings, the tire tester of this invention includes a generally rectangular tank 10 adapted to hold water. To minimize the amount of water used tank 10 is preferably rounded on the bottom as shown.

Figure 2:
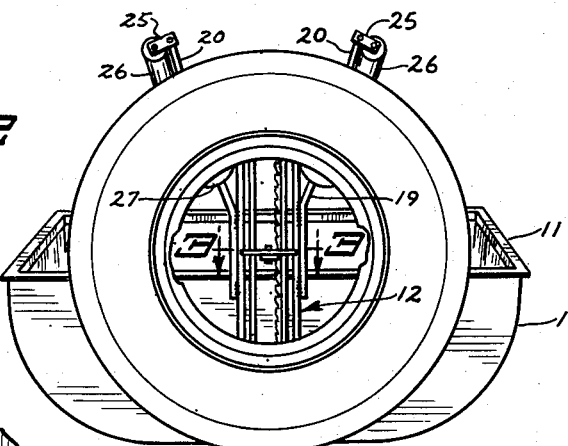
Figure 2 is a similar front elevation showing a tire in the tire receiving means outside of the water tank and ready to be tipped over into the water tank.
Figure 3:
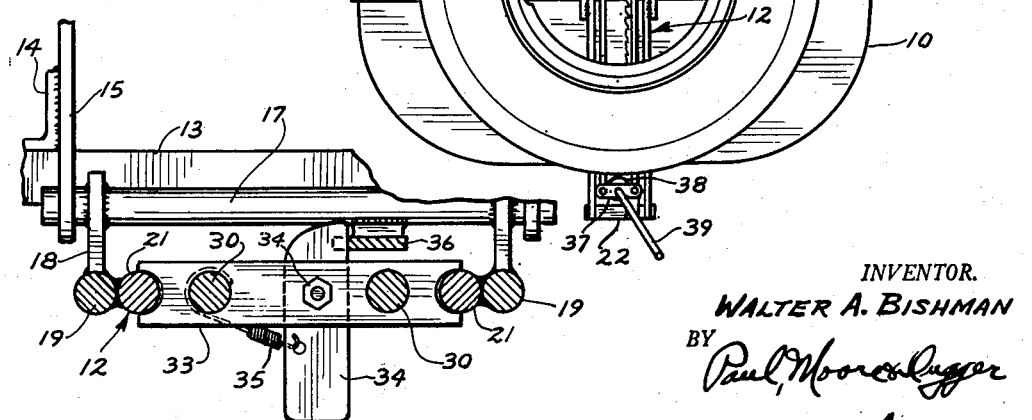
Figure 3 is a horizontal section taken on the line 3—3 of Figure 2 and in the direction of the arrows showing the latching mechanism for the adjustable tire receiving means.

The tank 10 is also preferably provided with a strengthening flange 11 around its upper edge. In the preferred form of construction shown in Figures 1 to 7 an adjustable tire receiving assembly, indicated generally at 12, is pivotally mounted centrally along one side edge of tank 10.

The support means for the tire receiving assembly 12 comprises an elongate angle iron 13 adapted to fit over and be fastened to one of the tank flanges 11. Projecting inwardly from angle iron 13 is a pair of spaced apart angle brackets or supports 14, bolted, riveted or otherwise suitably attached. A pair of spaced apart supporting legs 15 are welded or otherwise suitably fastened to angle brackets 14. The upper ends of supporting legs 15 curve generally upwardly and outwardly to terminate just above the rim of tank 10. The lower portions of legs 15, below the brackets 14, extend generally downwardly and angularly inwardly and terminate in a common foot piece 16 which rests flatly upon the bottom of tank 10.

Journalled in the upper ends of spaced legs 15 is a horizontal shaft 17 substantially parallel to and slightly spaced above the edge of tank 10. Keyed to shaft 17 and spaced inwardly from the ends are a pair of spaced lugs 18 by which the frame of the tire receiving assembly is mounted for pivotal movement. The frame comprises a pair of spaced apart rod members 19 having parallel portions in the vicinity of the pivotal mount and divergent portions terminating in a pair of parallel right angle projections 20, spaced apart from each other and from the pivotal mount.

A pair of elongate spaced apart parallel rod members 21 are welded to the inner edges of the parallel portions of rod members 19. The frame is strengthened and members 21 are held spaced apart at one end by a strap 22 welded to the rods on one side. At the opposite end the frame is made rigid and members 21 and 19 are held in position by a bracing strap 23. For added strength, rod members 19 and 21 are preferably welded in holes in strap 23, as shown. A reinforcing and strengthening angular brace and bracket member 24 is welded to each end of strap 23. The projecting portion 20 of rod member 19 passes through and is welded into a hole in the angular bracket member 24. A roller supporting bracket 25 is welded to the extremities of each of projecting portoins 20 and a roller 26 is journalled for rotation in brackets 24 and 25.

Rollers 26, while generally parallel to one another, are very slightly inclined inwardly toward one another to help overcome the natural tendency of a tire to roll off the rollers when the tire is rotated. The degree of inward inclination of the rollers is slight, being in the range of about 2 to 10 degrees.

Disks 27 for giving support to the sidewalls of tires held within the tire receiving assembly and for assisting in preventing "tracking" when the tire is rotated are rotatably mounted on each of the divergent portions of rod members 19. Each of disks 27 is secured to the end of a short shaft 28 journalled in a sleeve 29 welded to rod 19. Sleeves 29 are so disposed that the disks are tilted slightly inwardly to about the same extent as rollers 26, i.e., about 3 to 10 degrees. Thus, when a tire in place in the tester is rotated as explained in greater detail hereinafter, a counter-rotational force is created by disks 27 which in cooperating with slightly inturned rollers 26 prevents the tire from "tracking" or running off of the rollers 26.

Slidably mounted between elongate parallel rod members 21 is a pair of spaced apart rod members 30 each having an elongate portion parallel to the rods 21 and terminating in a pair of parallel right angle projections 31. The ends of the elongate portion of rods 30 are held rigidly spaced apart, welded in holes in a flat rectangular plate 32. Plate 32 is notched at each end to receive the inside portions of rods 21 to permit rod members 30 to slide relative to rod members 21 and the rest of the frame assembly. A second notched plate 33 is provided spaced apart somewhat from plate 32 and welded to rods 30. Rods 30 and notched plates 32 and 33 form a rigid structure freely slidable between rod members 21.

Pivoted on plate 33 is a latch dog 34 which is held in engagement by coil spring 35 with the notches in an elongate ratchet bar 36. Ratchet bar 36 is held secure to the frame by being welded or otherwise suitably fastened to shaft 17 and strap 22.

The parallel right angle projecting portions 31 of rods 30 are held in rigid spaced apart position by a pair of spaced apart plates 37. The projecting rod portions 31 are welded in holes at the opposite ends of plates 37. A roller 38 is journalled for rotation between plates 37. Roller 38 is rotatable by crank 39. Roller 38 is desirably knurled to increase traction with a tire tread.

Preferably, a further roller 40 is mounted longitudinally between rods 30, journalled for rotation between a pair of plates 41 which in turn are welded to rods 30 adjacent the ends near right angle projections 31.

The frame pivotally mounted on the side of water tank 10 and rollers 26 and 38 define a cradle or tire receiving assembly. The tire-receiving assembly is pivotally mounted on the edge of the water tank for receiving a tire from the outside of the tank and permitting it to be readily tipped over into the tank. In normal position on the outside of the tank the tire receiving assembly is inclined from the vertical for easily rolling a heavy tire into position.

The larger the tire to be tested the farther out roller 38 must be set and the lesser is the incline. The operator can easily roll even the largest and heaviest tire onto the frame without any heavy lifting. This is a particular advantage of the present invention.

Roller 38 is adjusted from rollers 26 just sufficient to permit a tire to be easily rolled into place and latch dog 34 is pre-set at this spacing. The weight of the tire is initially borne by roller 38 and the frame members.

As the tire and tire receiving assembly are tilted toward the tank the weight of the tire gradually shifts until at least part of it is carried by rollers 26. At this time, if it has been pre-set too widely, roller 38 is moved downwardly by gravity to rest against the tire tread and is locked in place against outward movement by dog 34 latching in one of the notches of ratchet bar 36. The tire is partially submerged in water in the tank 10. When crank 39 is turned rotating roller 38, the frictional engagement between roller 38 and the tread of the tire causes rotation of the tire in the water in tank 10. The tire is rotated slowly through the water and the presence of any leaks is indicated by bubbles arising from the water. The tire rotates freely on rollers 26 at the bottom of the tank and against side roller 40. Any tendency of the tire to roll off of rollers 26 while the tire is being rotated is counteracted by disks 27 and the slightly inturned positions of rollers 26 which act to keep the tire in place. After testing is completed the tire and tire-receiving assembly are readily tilted back out of tank 10 and the tire is easily removed.

Referring now to Figures 8 and 9, there is shown here a somewhat modified and simplified form of construction wherein roller 38, crank 39 and accessory elements have been replaced by a simple loop 42 formed at the ends of spaced apart rod members 30. The loop 42 projects at substantially a right angle from the rod members 30 to form one side of a tire-receiving cradle having rollers 26 at its opposite side.

By means of the adjusting mechanism heretofore explained the tire-receiving assembly of this modified form of the invention can readily be made larger or smaller to receive tires of varying sizes. Latch dog 34 is preset in a notch in ratchet bar 36 so that loop 42 is spaced from rollers 26 an appropriate distance to receive the tire to be tested. When the tire is in place the cradle is tipped over and into tank 10. The weight of the tire shifts to rollers 26 and, if necessary, loop 42 drops down by gravity to more closely confine the tire and latch dog 34 locks the assembly in this new position.

The tire is tested simply by grasping the tread of the tire by hand and rotating it upon rollers 26. Because of the inherent buoyancy of the tire, and aided by rotating disks 27 and roller 40, the tire is rotated manually with relative ease. At the conclusion of the test the tire and pivoted tire-retaining assembly is easily tipped up and out of the tank by grasping loop 42 and easing it to the floor.

Referring to Figures 10 and 11, there is shown here a further modified and greatly simplified form of construction. The mechanism for providing adjustment of the tire-receiving assembly for use with different sizes of tires has been eliminated. A simple loop 43 is formed at the ends of parallel spaced apart rod members 21. The loop 43 projects at substantially right angles to rods 21 to form one side of a tire-receiving cradle having rollers 26 at its opposite side.

An elongated roller 40A is also preferably mounted longitudinally between rods 21, journalled for rotation between a pair of spaced apart plates 41A which in turn are welded to rods 21 adjacent to the ends near loop 43. Roller 40A assists rotation of a tire in tank 10 by relieving much of the friction which would otherwise be encountered between the sidewall of the tire and the frame members.

This simplified form of tire tester may be made especially to handle a single tire size or it may be made to handle all tire sizes. In this latter instance it must necessarily be large enough to handle the largest tire size. This is not a particular disadvantage, even when handling much smaller size tires. The tire is simply rolled into the loop end of the cradle and allowed to rest against rod members 21. Then as the cradle and tire are tipped up and into the tank with one hand the other hand serves to guide the tire as it slides down onto rollers 26 and against rotating plates 27. The tire is then easily rotated by hand within the tank. When the tire and cradle are tipped up and out of the tank it is again advisable to guide the tire as it slides downwardly against loop 43.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A tubeless tire tester comprising a tank adapted to contain water and having a mounting edge, an elongated tire receiving frame, a pivotal connection between the middle part of said frame and said mounting edge said pivot being located so that said frame may be tilted about said pivotal connection from a testing position in which a first end of said frame is downward and within said tank to a loading position in which the opposite end of the frame is downward and no part of said frame is within the tank, a pair of rotatable tire retaining members for engaging the tread of a tire said member being mounted spaced apart at said first end of said frame, and a further tire retaining member for engaging the tread of a tire mounted at the opposite end of said frame.

2. A tubeless tire tester according to claim 1 further characterized in that said opposite end of the frame bearing further tire retaining member is slidably movable with respect to the rest of said frame in a direction toward and from said pair of rotatable tire retaining members and has means for limiting the outward movement of the slidable portion of the frame within the rest of said frame.

3. A tire tester according to claim 1 further characterized in that said further tire retaining member comprises a roller which is manually rotatable.

4. A tire tester according to claim 1 further characterized in that a roller is journalled longitudinally in said frame adjacent the further tire retaining member in a position to be engaged by the sidewalls of a tire.

5. A tubeless tire tester according to claim 1 further characterized in that said frame is provided with a pair of rotatable disks adjacent to said pair of rotatable tire retaining members, said disks being substantially in the plane of said frame and positioned to engage the side wall of a tire positioned against the frame.

6. A tire tester according to claim 1 further characterized in that said further retaining member comprises an elongated member projecting outwardly from said frame to contact the tread of the tire at two circumferentially spaced points.

7. A tire tester according to claim 6 further characterized in that said opposite end of the frame bearing the further tire retaining member is slidably movable with respect to the rest of the frame in the direction toward and from said pair of rotatable tire retaining members and has means for limiting the outward movement of the slidable portion of the frame within the rest of the frame.

8. A tubeless tire tester comprising a tank adapted to contain water having a mounting edge along one side thereof, a tire receiving and holding frame pivotally mounted with respect to said mounting edge of said tank by a pivot connecting between the mounting edge and one side of the frame at a point generally near the middle of the frame so that the frame is adapted to be tilted back and forth about said pivot so as to bring the testing end of the frame within said tank in a testing position and the opposite end of the frame is elevated, and to be tiltable to a loading position in which said opposite end of the frame is lowered and the testing end of the frame is elevated above said edge when the frame is tilted to a loading position, a pair of rotatable members for engaging the tread of a tire, said members being mounted spaced apart at the testing end of said frame and projecting therefrom generally away from the side of the frame to which the pivot connection is attached, a portion of said frame being formed as a slidable member movable longitudinally on the frame with respect to the rest of said frame, a rotatable member mounted adjacent the outer end of said slidable member so as to project therefrom and also engage the tread of a tire, means for manually rotating said last named rotatable member and means for limiting the outward movement of said slidable member with respect to the rest of said frame.

9. A tubeless tire tester according to claim 8 further characterized in that said rotatable members comprise rollers journalled for rotation in brackets at the ends of said frame.

10. A tubeless tire tester according to claim 8 further characterized in that the rotatable member mounted in the slidable member is a knurled roller for increasing frictional engagement with a tire tread.

11. A tubeless tire tester according to claim 10 further characterized in that the means for rotating said knurled roller is a crank.

12. A tubeless tire tester according to claim 9 characterized in that a further roller is mounted longitudinally in respect to the frame adjacent the manually rotated roller for engaging the side of a tire.

13. A tubeless tire tester according to claim 9 further characterized in that said frame is provided with a pair of rotatable disks adjacent to said first named pair of rotatable members, said disks being substantially in the plane of said frame and positioned to engage the side of a tire.

14. A tubeless tire tester according to claim 9 further characterized in that said movement limiting means comprises a spring actuated latching dog on said slidable member and a stationary ratchet bar on said frame adapted to engage said latching dog.

15. A tubeless tire tester comprising a tank adapted to contain water, and having a mounting edge thereon, an elongated frame having a length greater than the diameter of the tires to be tested, said frame having a pivotal connection near the middle thereof said pivotal connection being attached to said mounting edge with the pivot axis transverse to the length of the frame and generally parallel to said mounting edge, a pair of parallel rollers mounted spaced apart at either side of the longitudinal centerline of the frame near the testing end of said frame and projecting outwardly from the plane of said frame on the side of the frame opposite said pivot for engaging the tread of a tire, a pair of rotatable members mounted on the frame adjacent to said rollers for engaging the sidewall of a tire said rotatable members being substantially in the plane of said frame, said frame including a portion which is slideable longitudinally of the frame with respect to the rest of said frame, a manually rotatable roller mounted adjacent to the outer end of said slidable member, said roller projecting outwardly from the plane of said frame and substantially parallel to and at the opposite end of the frame for engaging the tread of a tire generally opposite the parts engaged by said pair of rollers, crank means for rotating said manually rotatable roller, further roller means mounted on said slidable member adjacent to the manually rotatable roller in a position to engage the sidewall of a tire and means for limiting the outward movement of said slidable member within the rest of said frame.

References Cited in the file of this patent
UNITED STATES PATENTS

| | | |
|---|---|---|
| Re. 20,502 | Lookholder | Sept. 14, 1937 |
| 1,042,558 | Karp | Oct. 29, 1912 |
| 1,376,579 | Ramsdell | May 3, 1921 |
| 1,733,459 | Hooper et al. | Oct. 29, 1929 |
| 2,203,688 | Little | June 11, 1940 |
| 2,444,992 | Kittel | July 13, 1948 |